United States Patent [19]

Castiglioni et al.

[11] Patent Number: 4,827,543

[45] Date of Patent: May 9, 1989

[54] REST STRUCTURE IN THE FORM OF ROD-SHAPED BODIES REMOVABLY CONNECTED TO CROSS-MEMBERS

[76] Inventors: Achille Castiglioni, Piazza Castello, 27, 20121 Milan; Ernesto Zerbi, Via Riccardo Galeazzi, 4, 20161 Milan; Giancarlo Pozzi, Via Monte Cervino, 7, 20149 Milan, all of Italy

[21] Appl. No.: 19,530

[22] Filed: Feb. 26, 1987

[30] Foreign Application Priority Data

Mar. 5, 1986 [IT] Italy .............................. 21139/86[U]
Jun. 17, 1986 [IT] Italy .............................. 22285/86[U]

[51] Int. Cl.$^4$ ............................................. A47C 19/00
[52] U.S. Cl. ........................................ 5/191; 403/347;
403/374; 5/200 B; 5/200 C; 5/282 R; 5/285;
5/236 R; 5/310
[58] Field of Search ................. 5/191, 200 R, 200 B,
5/200 C, 201, 282 R, 282 B, 236 R, 285, 202,
310, 271, 220, 225 B, 286, 236 R; 403/347 X,
374 X; 108/56.1, 153, 154, 901, 902

[56] References Cited

U.S. PATENT DOCUMENTS

| | | | |
|---|---|---|---|
| 510,541 | 12/1893 | Kenney et al. | 5/200 R |
| 620,481 | 2/1899 | Moody | 411/79 |
| 808,667 | 1/1906 | Locklin | 5/200 C |
| 1,390,630 | 9/1921 | McCord | 5/202 B |
| 1,620,055 | 5/1928 | Trimble | 5/200 R |
| 1,821,182 | 9/1931 | Hoppes | 403/374 |
| 2,972,495 | 2/1961 | Yalen | 108/153 |
| 3,256,839 | 6/1966 | Peterson et al. | 108/56.1 |
| 3,654,877 | 4/1972 | Barrett | 108/901 |
| 3,695,649 | 10/1972 | Lavergne | 403/347 |
| 3,846,856 | 11/1974 | Tu | 5/420 |
| 4,106,140 | 8/1978 | Kievits | 5/191 |
| 4,196,484 | 4/1980 | Harris | 5/201 |
| 4,281,424 | 8/1981 | Singer et al. | 5/282 R |
| 4,308,802 | 1/1982 | Munz | 108/153 |
| 4,646,371 | 3/1987 | Nowell | 5/201 |

FOREIGN PATENT DOCUMENTS

| | | | |
|---|---|---|---|
| 3326692 | 2/1985 | Fed. Rep. of Germany. | |
| 513853 | 2/1921 | France. | |
| 2102577 | 4/1972 | France | 403/247 |
| 54121 | 10/1942 | Netherlands | 5/236 |
| 294632 | 2/1954 | Switzerland | 5/236 |
| 5568 | of 1890 | United Kingdom | 5/282 R |
| 1425566 | 2/1976 | United Kingdom | 108/153 |
| 1596473 | 8/1981 | United Kingdom | 5/191 |

Primary Examiner—Alexander Grosz
Assistant Examiner—Eric K. Nicholson
Attorney, Agent, or Firm—Steinberg & Raskin

[57] ABSTRACT

A rest structure supported by support elements, with or without interposing mattresses and/or cushions, formed from a succession of hollow rod-shaped bodies disposed parallel to each other and sustained on cross-members which intersect them and to which they are removably connected by couplings inserted in said rod-shaped bodies.

17 Claims, 5 Drawing Sheets

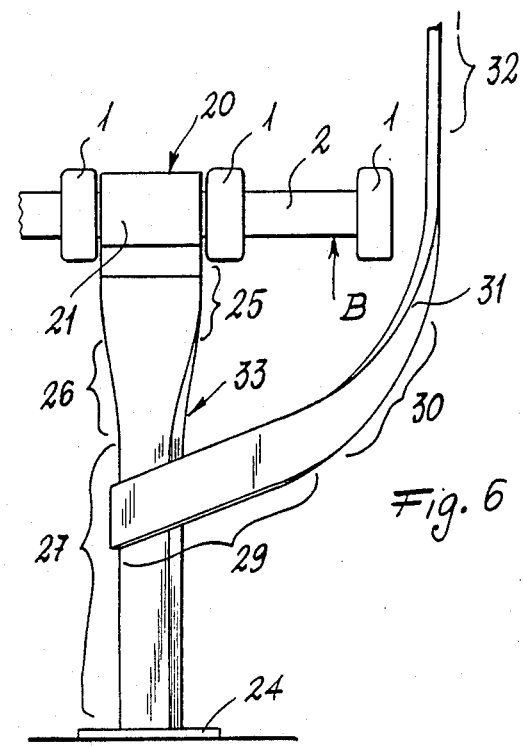
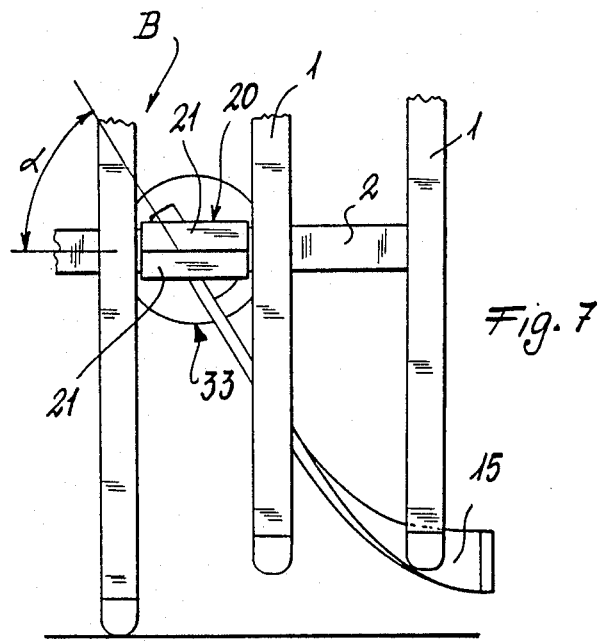

REST STRUCTURE IN THE FORM OF ROD-SHAPED BODIES REMOVABLY CONNECTED TO CROSS-MEMBERS

BACKGROUND OF THE INVENTION

This invention relates to a rest structure, which is supported by support elements and on which a person can lie or sit either with or without interposing mattresses and/or cushions, or on which objects of any kind can be rested, the combination and conformation of its parts giving the rest structure particularly useful characteristics.

Plane rest structures, and in particular beds, are known to comprise a perimetricral main frame carrying the secondary framework (mesh, elastic material, or staves of any kind). This involves not only the presence of the main frame but also a constructional interdependence between the frame measurements and the secondary framework measurements, these latter being determined by the application. In other words, the presence of the main frame in a bed, as in any other plane rest structure, is a disadvantage.

The support elements by which such plane rest strucures are supported on the floor can be of various types. A support element has been devised which by virtue of its particular component shapes and arrangements makes it easily and removably connectable to plane rest structures at their cross-members, allows it to suitably and reliably oppose the complex forces which arise during the use of such plane rest structures, and is able to support the headboards and possible footboards with which the plane rest structure may be provided if in the form of a bed.

SUMMARY OF THE INVENTION

The main object of the present invention is to provide a rest structure which can be dismantled into and assembled from its components, which are of small size, and which by not comprising a perimetrical main frame can be adapted in width—for constant length—to the most varied requirements with a minimum of operations for this purpose.

This and further objects which will be more apparent from the detailed description given hereinafter are attained by a rest structure supported by support elements, characterized by being formed from a succession of hollow rod-shaped bodies disposed parallel to each other and sustained by cross-members which intersect them and to which they are removably connected by couplings inserted into said rod-shaped bodies.

Advantageously, the rod-shaped bodies consist of tubular sections formed by extruding plastics material.

The advantages obtained by the invention are apparent. The plane rest structure can be constructed to the required size by using a suitable number of equal hollow rod-shaped bodies, and a corresponding number of couplings and identical cross-members, which are the only components which have to be cut to size, from extruded sections. The plane rest structure can be dismantled into its component parts to occupy a small bulk, this fact positively influencing transport and storage costs.

According to the invention, the support element which determines the aforesaid advantages is characterized essentially by comprising at its upper end a clamp for removable connection to the cross-member of the plane rest structure, and having an upper portion substantially lying in a plane coincident with or parallel to the centre plane through the cross-member, and a lower non-coplanar portion forming an angle with the preceding.

The element can comprise a shaped arm preferably of metal plate, which forms a component of and support for the headboard and/or footboard of the plane rest structure.

Advantageously, the support element is formed preferably from a metal plate twisted so that in proximity to the clamp it comprises a first portion substantially coincident with the longitudinal centre plane through the cross-member, whereas the second portion, after the twisted zone, lies at a given angle to the first.

This angle is advantageously about 60° to provide the required stability to the plane rest structure when under load, and to obtain the optimum attitude for the shaped projecting arm so that it projects beyond the outline of the plane rest structure.

BRIEF DESCRIPTION OF THE DRAWINGS

The invention will be more apparent form the detailed description given hereinafter by way of example with reference to the accompanying drawing, in which:

FIG. 6 is a frontal view thereof when in use;

FIG. 7 is a plan view thereof when in use; and

FIG. 8 is a partial perspective view of a plane rest structure (in the form of a bed) with two support elements according to the invention.

DESCRIPTION OF THE PREFERRED EMBODIMENTS

Figure 1:
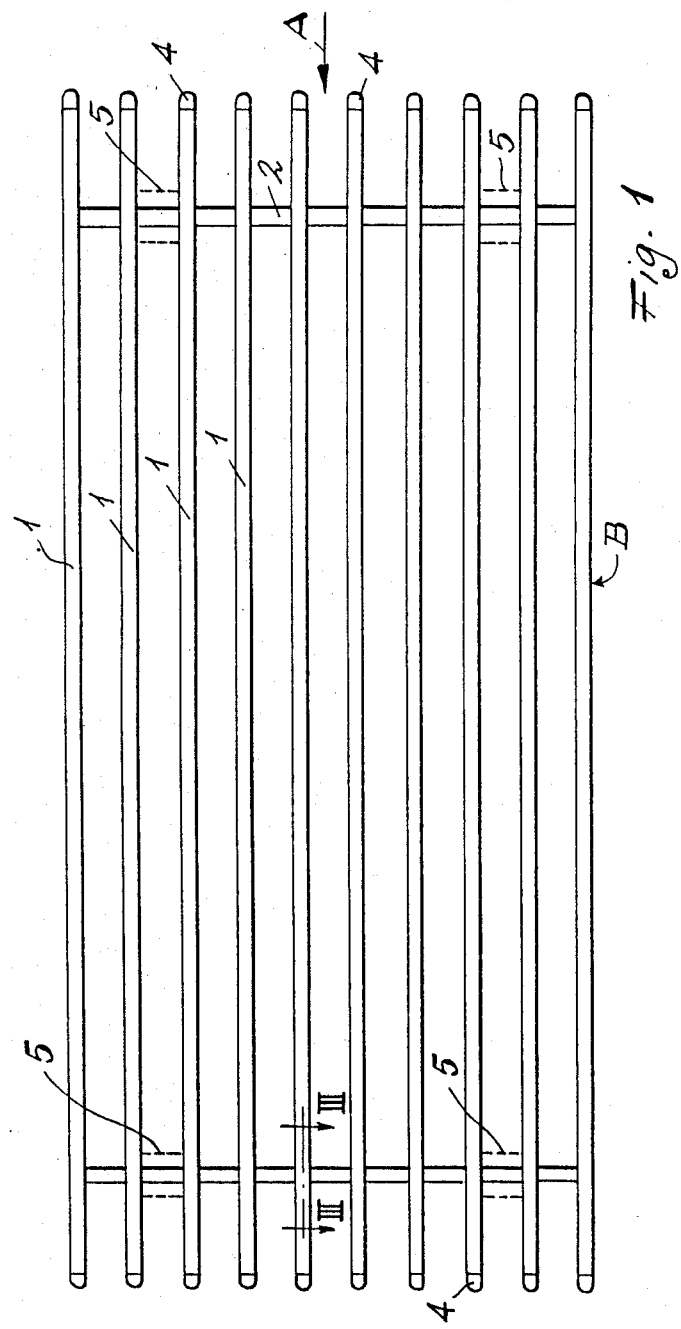
FIG. 1 is a plan view of a rest structure.
Figure 2:
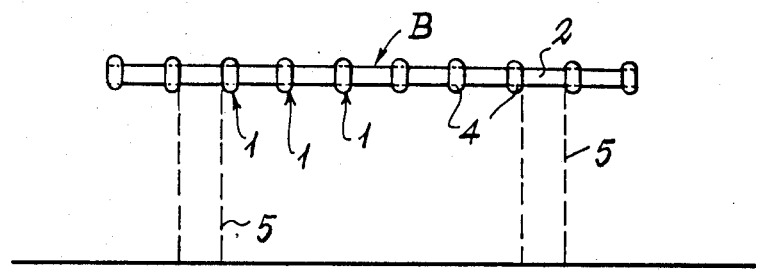
FIG. 2 is a view thereof in the direction of the arrow A of FIG. 1.

With reference to the figures, the rest structure (for example a bed), indicated overall by B, comprises a series of hollow rod-shaped bodies 1, hereinafter also called longitudinal members and formed from extruded tubular sections preferably of plastics material. These rod-shaped bodies are identical in this example, and are sustained on a pair of cross-members 2 also in the form of rod-shaped bodies but which can be either hollow or solid. The cross-members traverse the longitudinal members 1 through aligned apertures 3 of corresponding shape formed in them. In the embodiment shown, the longitudinal members are of rectangular cross-section and the cross-members of square cross-section, but other shapes are possible. Closure plugs 4 are fitted into the ends of the longitudinal members so as to close them.

The longitudinal members 1 are disposed parallel to each other at predetermined intervals, and extend in the longitudinal direction of the bed in order to give correct physiological rest to the occupant occupying an overlying mattress, not shown.

The plane rest structure B is supported by support elements indicated overall by 5, which are described in detail hereinafter.

Figure 3:
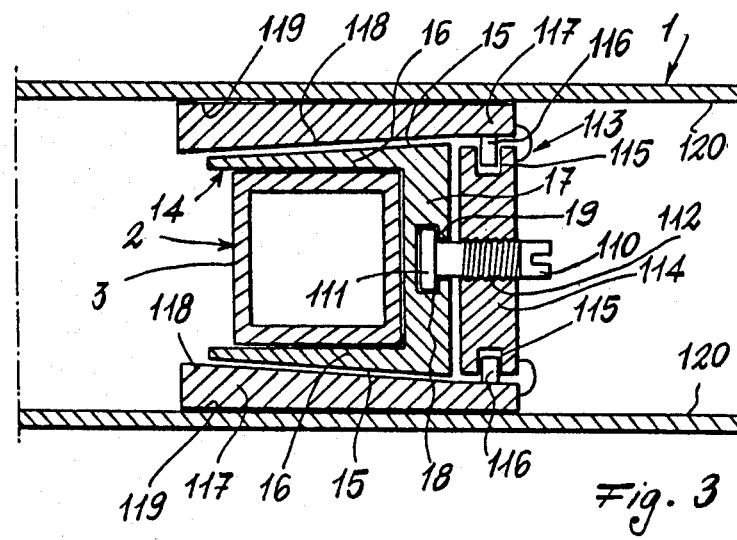
FIG. 3 is a section on the line III—III of FIG. 1 showing an already installed coupling for connecting together a hollow rodshaped body and a cross-member.
Figure 4:
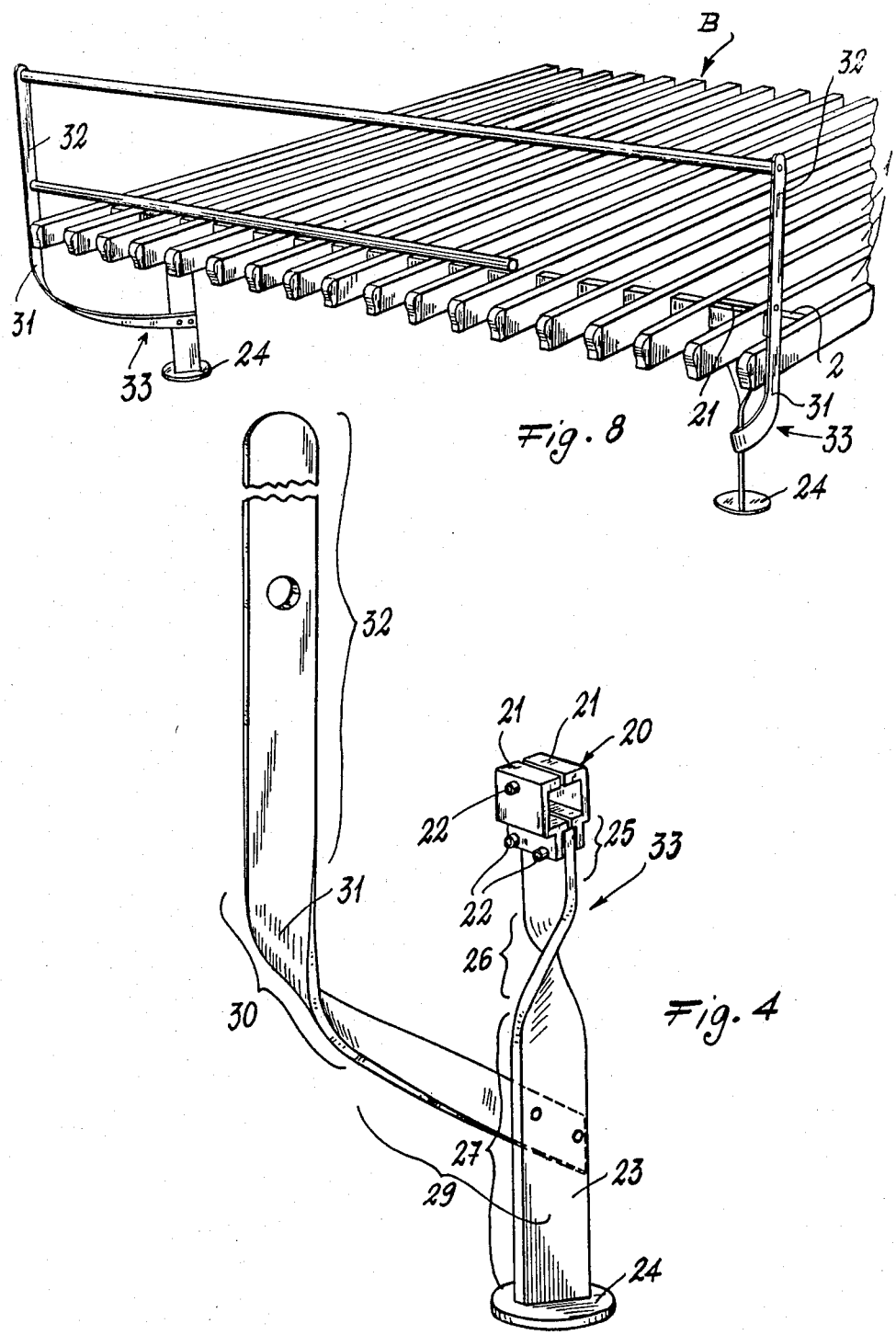
FIG. 4 is a perspective view of the support element according to the invention.
Figure 5:
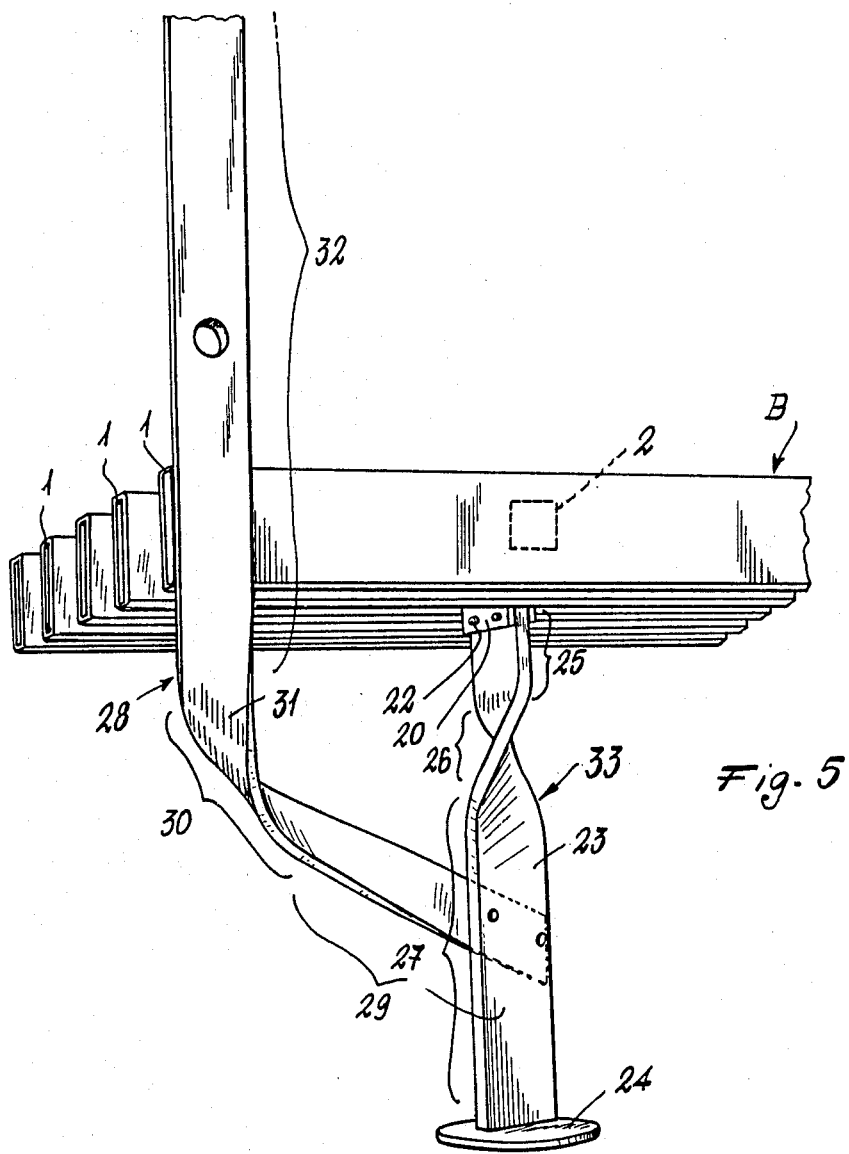
FIG. 5 is a perspective view thereof when in use.

The connection between the longitudinal members 1 and crossmembers is made by couplings disposed in the longitudinal members, one of which is shown installed in FIG. 3.

The coupling is intended to be inserted into the longitudinal member 1, and comprises a first member indicated overall by 14 which in this example is shaped as a fork in such a manner as to embrace the cross-member 2 on three sides. The outer faces 15 of the two arms 16 of the member 14 have inclined surfaces. The base 17 has a seat 18 with undercuts 19 and is open on one side to allow insertion of the head 111 of a drive screw 110.

Said screw is screwed into a threaded bore 112 in a second member 113 of the coupling. Said second member embraces the first and comprises three parts in the illustrated embodiment, namely a substantially flat base part 114 which becomes situated parallel to the base 17 of the first member 14 and in which the threaded bore 112 is provided from which there projects the screw 110, which can be provided at its free end with a straight slot or a cross, or with a profiled head, to allow engagement by a tool (screwdriver, socket spanner or the like) with which to tighten the coupling. Furthermore, the base part 114 comprises in two opposing sides two dead bores 115, into which pins 116 provided on the two other identical parts 117 of the second member 113 are inserted. The lateral parts 117 extend at a right angle to the base part 114, and lie over the arms 16 of the first member 14 so that their inclined surfaces 118 face these latter, whereas their opposite surfaces 119 are intended to rest against the minor inner faces 120 of the longitudinal member 1.

The present invention also covers an embodiment in which the second member 113 is constructed in a single piece, for example of plastics material such as nylon, by conventional methods. The dimensions and choice of materials depend on the application and/or production requirements. The two rod-shaped bodies 1, 2 to be connected together can be of different cross section from that shown, for example polyhedral or circular, and the two cross members 14 and 113 will then be shaped in relation thereto. The member 14 can also be constructed in a number of parts connected together in a suitable manner to allow fitting to the cross-member. The operation of the coupling is substantially as follows: the two rod-shaped bodies (longitudinal member and cross-member) 1, 2 are inserted one into the other in the position shown in the figures. The coupling in its slackened state is inserted into the longitudinal member 1 until the base 17 of its first member 14 encounters the cross-member 2. At this point the components of the coupling assume substantially the position shown in FIG. 3. On turning the screw 110 by means of a suitable tool, the members 14 and 113 move relative to each other, and their inclined surfaces 15 and 118 mutually cooperate by virtue of this movement, to elastically force the arm 16 of the first member 14 against the cross-member 2, so locking it. Likewise, the outer faces 119 of the member 113 are forced against the walls 20 of the longitudinal member 1.

FIGS. 4 to 8 are indicative illustrations of a support element designed to support plane rest structures B formed from hollow members 1 disposed parallel to each other and sustained by cross-members 2 to which they are connected. Said support element, preferably of metal, and indicated overall by 33, comprises at its upper end a clamp 20 formed from two jaws 21 which, in this example, are clamped by means of screws 22 both against the end of a helically twisted metal plate 23 acting as a leg and provided lowerly with a resting foot 24, and against the cross-member 2 which is in this case of square cross-section. It is however apparent that the same inventive concept also covers clamps in which at least one of the relative jaws is represented by a suitably shaped extension of the leg 23.

This latter, starting from the clamp, comprises a portion 25 lying in a plane coincident with or parallel to the vertical centre plane through the cross-member 2. The portion 25 is followed by a helically twisted zone 26 such as to change the angle at which the underlying portion 27 of the leg 23 lies. This angle, indicated by $\alpha$, is preferably about 60°. The portion 27 of the leg 23 is connected by screws to an arm 28 applied to substantially flat metal bar, which has an initial portion 29 connected to the leg 23, this portion being inclined both to the horizontal and to vertical. This initial portion is followed by a helically twisted zone 30 which is connected by an elbow 31 to a vertical portion 32 lying in a plane preferably parallel to that of the hollow bodies 1 and acting as a support for the headboard and/or footboard of the plane rest structure B when used as a bed.

By virtue of the conformation of the described cooperating parts, the vertical portion 32 lies external to the contour of the plane rest structure B, even though the leg 23 is necessarily located within this contour as its clamp is required to engage the cross-member 2. Again by virtue of the conformation and arrangement of the described parts of the support element, the plane rest structure which is supported by four such elements, rests stably on the ground, ie, without the complex forces, including dynamic forces, to which it is subjected during use being able to cause oscillation or yielding and thus give that sensation of instability which, in practice- would make it unsuitable for use as a bed, divan or the like.

What is claimed is:

1. A rest structure supported by support elements, for lying or sitting with or without interposing mattresses or cushions, and being formed from a succession of hollow rod-shaped bodies disposed substantially parallel to each other and sustained on cross-members which intersect said hollow rod-shaped bodies and to which said hollow rod-shaped bodies are removably connected by separate couplings removably inserted within said hollow rod-shaped bodies at points of said intersections and being completely hidden from outside view,
   wherein each said cross-member extends into and through said respective hollow rod-shaped body at said respective intersection point,
   said rest structure being substantially rigid and self-supporting, and
   said cross-members being each adjustably positionable with respect to said hollow rod-shaped bodies at said respective intersection points.

2. A rest structure as claimed in claim 1, wherein the hollow rod-shaped bodies are substantially identical to each other.

3. A rest structure as claimed in claim 1, wherein the hollow rod-shaped bodies are disposed in a longitudinal direction of the structure.

4. A rest structure as claimed in claim 1, wherein the hollow rod-shaped bodies are closed at their ends by removable plugs.

5. A rest structure supported by support elements for lying or sitting with or without intreposing mattresses or cushions, and being formed from a succession of hollow rod-shaped bodies disposed substantially parallel to each other and sustained on cross-members which intersect said hollow rod-shaped bodies and to which said hollow rod-shaped bodies are removably connected to couplings inserted in said hollow rod-shaped bodies,
- wherein each said coupling comprises for insertion into a respective hollow rod-shaped body, two members one inside the other, provided with inclined cooperating surfaces,
- the inner of said members being arranged to embrace a respective cross-member when said cross-member is positioned within said inner member, with means for joining said members together in such a manner to produce, when in use, relative movement between said members which, by virtue of the cooperation between said surfaces, results in a substantially rigid connection of said hollow bodies to the cross-members by means of the coupling.

6. A rest structure supported by support elements, for lying or sitting with or without interposing mattresses or cushions and being formed from a succession of hollow rod-shaped bodies disposed substantially parallel to each other and sustained on cross-members which intersect said hollow rod-shaped bodies and to which said hollow rod-shaped are removably connected by couplings inserted in said hollow rod-shaped bodies,
- comprising supporting elements each having at an upper end thereof, a clamp for removable connection to a respective cross-member and having an upper portion extending between lateral edges of said clamp substantially along a plane coincident with or parallel to a centre plane through said respective cross-member and a lower portion which is not coplanar but forms an angle α with the upper portion.

7. A rest structure as claimed in claim 6, comprising an arm which is connected to the lower portion and extends in such a manner as to project beyond an outline of the rest structure and terminate in a substantially vertical upright which acts as a support for a headboard or footboard for said rest structure.

8. A rest structure as claimed in claim 6, being formed from a plate twisted in such a manner as to form the two portions lying at said angle.

9. A rest structure as claimed in claim 6, wherein the two portions form an angle of about 60° with each other.

10. A rest structure as claimed in claim 7, being formed, together with the arm, from metal plate.

11. A rest structure as claimed in claim 6, possessing a resting foot.

12. A rest structure as claimed in claim 10, wherein the metal plate is twisted to obtain the angle.

13. The structure of claim 5, wherein said inner member is substantially in the shape of a C with a recess for receiving said respective cross-member, and
- said outer member is also substantially in the shape of a C for receiving said inner member.

14. The structure of claim 13 wherein said fastening means comprise a screw.

15. The structure of claim 14, wherein outer faces of two arms of said substantially C shaped inner member constitutes said respective inclined surfaces of said inner member, and
- a base of said inner member comprises a seat for receiving a head of said screw.

16. The structure of claim 15, wherein said outer member is formed into three separate parts:
- a substantially flat base having a bore for receiving said screw and two indentations at opposite ends thereof; and
- two substantially identical lateral parts, each having a pin for seating in a respective indentation of said base, extending substantially perpendicularly to said base when said pin is eated in said indentation and comprising an inclined surface complementary to said respective inclined surface of said inner member, and a surface opposite too said inclined surface which is seated against an inner surface of said respective hollow rod-shaped body when assembled therein.

17. The structure of claim 7, wherein said arm comprises
- an initial portion connected to said lower portion and being inclined both horizontally and vertically, when assembled,
- a helically twisted zone connected to said initial portion, and
- an elbow connected to said helically twisted zone and to said upright which extends, between edges thereof, substantially parallel to a direction said hollow rod-shaped bodies extend, when said structure is assembled.

* * * * *